US012646104B2

(12) United States Patent
    Loveless

(10) Patent No.: US 12,646,104 B2
(45) Date of Patent: **\*Jun. 2, 2026**

(54) DISTRIBUTED MATCHING ENGINE

(71) Applicant: CFPH, LLC, New York, NY (US)

(72) Inventor: Jacob Loveless, New York, NY (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,368

(22) Filed: Dec. 12, 2023

(65) Prior Publication Data

US 2024/0135430 A1     Apr. 25, 2024

Related U.S. Application Data

(63) Continuation of application No. 17/503,680, filed on Oct. 18, 2021, now Pat. No. 11,880,878, which is a continuation of application No. 16/551,891, filed on Aug. 27, 2019, now Pat. No. 11,151,635, which is a continuation of application No. 13/832,472, filed on Mar. 15, 2013, now Pat. No. 10,424,004.

(60) Provisional application No. 61/737,553, filed on Dec. 14, 2012.

(51) Int. Cl.
     *G06Q 30/00*          (2023.01)
     *G06Q 30/0601*        (2023.01)

(52) U.S. Cl.
     CPC ................................. *G06Q 30/0635* (2013.01)

(58) Field of Classification Search
     CPC ........... G06Q 30/0635; G06Q 30/0633; G06Q 30/06331; G06Q 30/06332; G06Q 30/06333; G06Q 30/06334; G06Q 30/0637; G06Q 10/083; G06Q 10/087

USPC ....................................................... 705/26, 27
     See application file for complete search history.

(56) References Cited

U.S. PATENT DOCUMENTS

| | | | | |
|---|---|---|---|---|
| 7,565,313 B2 * | 7/2009 | Waelbroeck | ........... | G06Q 40/03 |
| | | | | 705/37 |
| 7,774,263 B1 * | 8/2010 | Wunsch | ................. | G06Q 40/03 |
| | | | | 705/37 |
| 8,036,965 B1 * | 10/2011 | Mintz | .................... | G06Q 40/00 |
| | | | | 370/431 |
| 10,424,004 B2 * | 9/2019 | Loveless | ........... | G06Q 30/0635 |
| 10,817,937 B1 * | 10/2020 | Kemp | .................... | G06Q 30/08 |
| 11,151,635 B2 * | 10/2021 | Loveless | ........... | G06Q 30/0635 |
| 11,880,878 B2 * | 1/2024 | Loveless | ........... | G06Q 30/0635 |
| 2002/0107748 A1 * | 8/2002 | Boies | ..................... | G06Q 30/08 |
| | | | | 705/26.81 |
| 2006/0026090 A1 * | 2/2006 | Balabon | .................. | G06Q 40/04 |
| | | | | 705/37 |
| 2008/0046354 A1 | 2/2008 | Olsson | | |
| 2010/0088213 A1 * | 4/2010 | Czupek | ................. | G06Q 40/06 |
| | | | | 705/37 |
| 2010/0106636 A1 * | 4/2010 | Lutnick | ................. | G06Q 40/04 |
| | | | | 705/37 |

(Continued)

OTHER PUBLICATIONS

BIDS Trading: Block-Trading Venue Improves Efficiency for Large Orders Mahoney, Tim. Traders 23.308: NA. SourceMedia, Inc. (May 1, 2010): Dialog #225885904, 3pgs. (Year: 2010).*

(Continued)

*Primary Examiner* — Robert M Pond

(57) ABSTRACT

A system includes a plurality of servers that are configured to execute a distributed matching system for the trading of one or more items.

12 Claims, 1 Drawing Sheet

(56) References Cited

U.S. PATENT DOCUMENTS

2012/0191587 A1* 7/2012 Brumfield ............. G06Q 40/04
705/37

OTHER PUBLICATIONS

GFI Group Inc at Sandler ONeill and Partners Global Exchange & Brokerage Conference—Final Fair Disclosure Wire [Linthicum] Jun. 9, 2011; Dialog #875156918, 5pgs. (Year: 2011).*
NSE, Stockbrokers and Automated Trading AllAfrica.com, French ed. [Washington] Oct. 12, 2011; Dialog #898543970 3pgs. (Year: 2011).*

\* cited by examiner

DISTRIBUTED MATCHING ENGINE

CROSS REFERENCE TO RELATED APPLICATION

This application is a continuation of U.S. patent application Ser. No. 17/503,680 filed Oct. 18, 2021, which is a continuation application of U.S. patent application Ser. No. 16/551,891 filed Aug. 27, 2019 (now U.S. Pat. No. 11,151, 635 issued Oct. 19, 2021), which is a continuation application of U.S. patent application Ser. No. 13/832,472 filed Mar. 15, 2013 (now U.S. Pat. No. 10,424,004 issued Sep. 24, 2019), which claims the benefit of U.S. Provisional Application No. 61/737,553 filed Dec. 14, 2012, each of which is incorporated by reference herein in its entirety.

FIELD

Some embodiments relate to matching and/or trading items.

BACKGROUND

Systems may be used for the electronic matching and/or trading of items between users.

DETAILED DESCRIPTION

Figure 1:
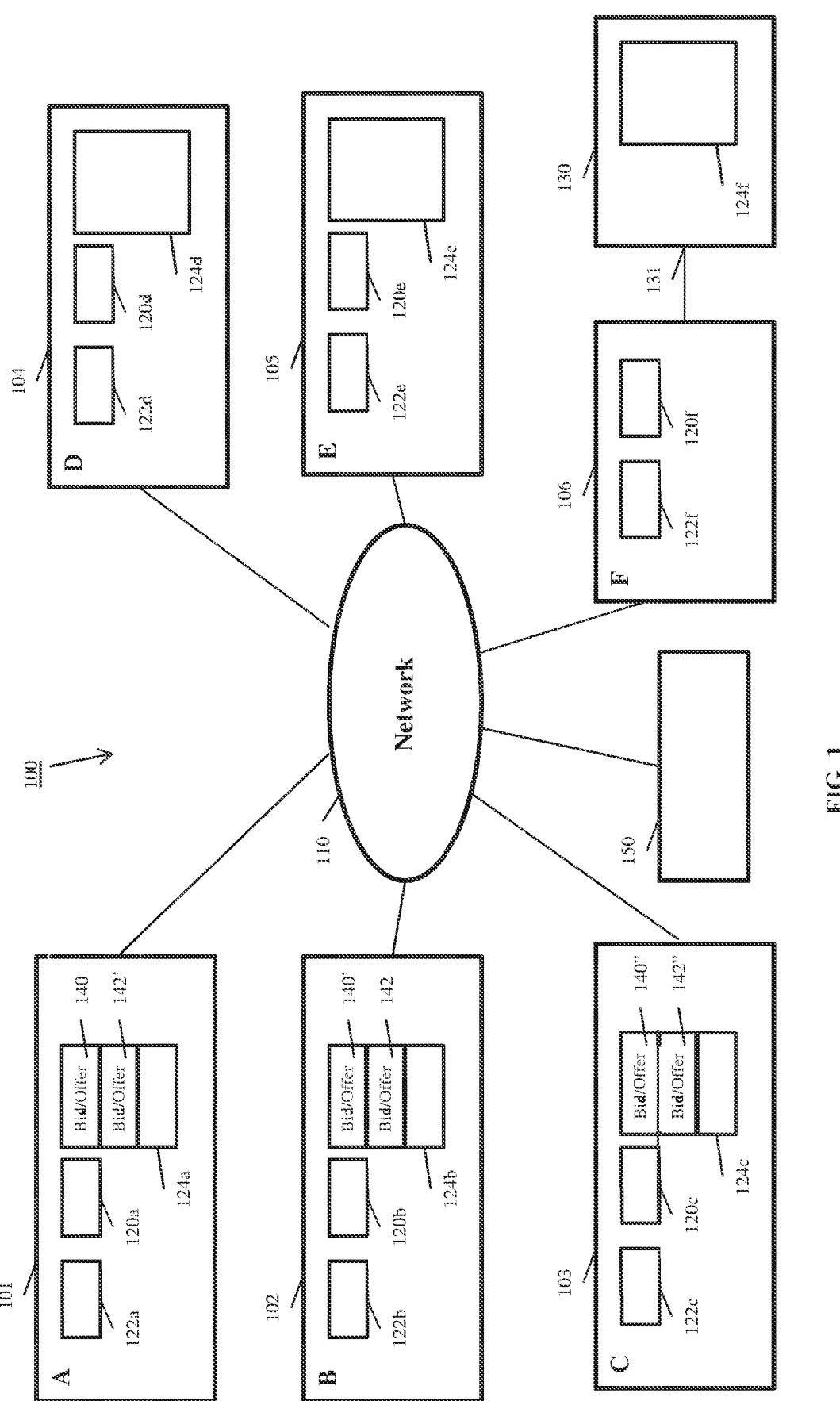
FIG. 1 shows an example distributed matching engine according to some embodiments.

Referring to FIG. 1, there is shown an example system 100 according to an example embodiment. System 100 may include one or more computing systems (e.g. servers) 101-106. Computing systems 101-106 may be referred to herein as servers for purposes of description. However, it should be understood that the use of the term server is non-limiting, and that other types of computing systems may be used.

Each server 101-106 may include one or more processors and one or more memories, which may include one or more databases. Each server may include one or more network hardware/software/firmware based interfaces that enable the server to connect to and communicate over network 110. Network 110 may include a public and/or private network(s) and be a wired and/or wireless network based on any type of technology. Network 110 may also include a bus and/or backplane type architecture. Network 110 may include one or more elements including routers, switches, etc. Network 110 may be configured to allow at least each of servers 101-106 to communicate with the other. Network 110 may also be configured to allow servers 101-106 to communicate with other computing systems (e.g., computing system 150) that may be on network 110 or may be on other networks not shown in FIG. 1 but are accessible via network 110. As one example, network 110 may be a private network that is interfaced to, via one or more routers/switches/etc. for example, one or more other private and/or public networks thereby allowing, for example, any one of servers 101-106 to communicate with other computing systems on such networks. One or more of servers 101-106 and network 110 may be configured to support unicast, broadcast, and/or multicast communications. The multicast communications may include IP multicasting, although other types of multicasting may be used. The multicasting may be reliable or unreliable multicasting. One skilled in the art will recognize that the above description of servers 101-106 and network 110 are merely examples, and that additional and/or other server/network configurations and functionality may be used. For example, in addition to network 110, one or more of servers 101-106 may also include one or more additional network hardware/software/firmware based interfaces that enable the server to connect to and communicate over one or more other public and/or private networks not shown in FIG. 1.

One or more of servers 101-106 within system 100 may be identically configured and/or substantially identically configured in terms of hardware (e.g., processor configuration, number of processors, processor speed, memory size, memory speed, etc.) and/or system software (e.g., operating system) and/or network interface(s) speed. Similarly, one or more of server's 101-106 ability to communicate with any other server over network 110 may be the same. One or more of servers 101-106 may be co-located within the same rack, room, building, etc. In addition, the network elements that make up network 110 may also be co-located with servers 101-106. Again, additional and/or other configurations are possible. For example, each server may have different performance capabilities.

System 100 may be referred to as cloud computing system. System 100 may be owned by and/or partially owned by and/or maintained/operated by one or more entities that lease or rent the resources of system 100 to one or more other users/customers, such as users A-F. Users A-F may be individual people and/or companies, such as banks, investments funds, trading firms, etc. Alternatively and/or in addition, one or more of users A-F may own resources of system 100. As an example, server 101 may be leased to or owned by user A, server 102 may be leased to or owned by user B, server 103 may be leased to or owned by user C, server 104 may be leased to or owned by user D, server 105 may be leased to or owned by user E, and/or server 106 be leased to or owned by user F. In general, each server 101-106 may be assigned to a particular user who has access to the resources of that server. A given user may be associated with/lease/own multiple servers within system 100. According to one example, system 100 may be expandable in that additional servers may be added to the system, which servers may be leased to or owned by uses A-F and/or new users. System 100 may be configured such that the addition and/or removal of one or more servers may not affect other users. As another example, a given server may be leased/rented to multiple different users that have no association with one another. The server may be configured such that use of the server by one of the users does not affect the other user, and vice versa.

According to one example, system 100 may operate as and/or be configured as a trading or matching system and in particular, a distributed trading/matching system, that allows users, such as users A-F, to trade and/or buy-sell one or more items with one another. The item(s) traded on system 100 may be owned by one or more of the users A-F of the system.

Alternatively and/or in addition, one or more of users A-F may be principals and/or brokers and/or agents, for example, acting on behalf of an entity(s) that may own the item(s). The traded items may include tangible and/or intangible items. According to one example, system 100 may be configured to trade one or more financial instruments, including for example, fixed income securities, equities, foreign exchange, etc. Accordingly, each user A-F may use system 100 to trade one or more financial instruments with one or more other users of the system. One skilled in the art will recognize that other types of items may be traded and/or bought/sold via system 100 such as, for example, real-estate (e.g., property, homes, and/or buildings), consumer products (e.g., cars, electronics), tickets (e.g., airline, concert), etc. One skilled in the art will recognize that in addition to and/or as an alternative to a trading or matching system, system 100 may operate as/be configured as other type(s) of systems.

One or more of servers 101-106 may also include (e.g., have stored in a memory) one or more applications 120*a-f* that execute thereon. As an example, applications 120*a-f* may be referred to herein as matching engines, although other and/or additional types of applications are possible. Matching engines 120*a-f* may enable users A-F to trade buy/sell items between one another. Matching engines 120*a-f* may be software and/or firmware and/or hardware based applications that execute on servers 101-106. Each server may include one and/or multiple matching engines. Each server may include additional and/or other applications. The matching engine(s) of each server 101-106 may be the same and/or substantially the same application, or different applications. For example, each matching engine may execute a similar matching algorithm. As another example, different matching engines may execute different matching algorithms. Matching engines 120*a-f* may be developed/maintained by the entity(s) that own/operate system 100. Such entities may also develop/maintain other and/or additional applications that execute at each server.

Each server may also include one or more applications 122*a-e* (e.g., have stored in a memory) that execute thereon that are associated with users, such as users A-E. As an example, applications 122*a-e* may be referred to herein as trading applications, although other and/or additional types of applications are possible. According to another example, one or more trading application(s) (such as application 122*f*) may not execute on a server 101-105. Rather, the application may execute on a computing system, such as computing system 130, that is connected to a server, for example server 106. Computing system 130 may or may not be co-located with server 106 and/or other elements of system 100. Computing system 130 and server 106 may communicate over one or more private and/or public networks 131. As another example, computing system 130 and server 106 may communicate over network 110. According to one example, computing system 130 may be owned and operated by an entity that owns and operates system 100. According to another example, computing system 130 may be owned and operated by the user (here user F) associated with the server to which the computing system is connected. One skilled in the art will recognize that these configurations are merely examples and other and/or additional configurations are possible. For example, each server 101-105/computing system 130 may include one and/or multiple trading applications. Each server 101-105/computing system 130 may also include additional and/or other applications associated with users, such as users A-F.

According to one example, each trading application 122*a-f* may be configured to intercommunicate with respective matching engines 120*a-f* and thereby enable users A-F of system 100 to trade items. Each trading application 122*a-f* may be automated trading algorithms that executes trading strategies, and thereby generates trading orders (e.g., bids, offers, hits, takes) for example, on behalf of the respective users A-F. Each trading application(s) at a given server may be configured to trade one or more items. Each trading application 122*a-f* may be a software and/or firmware and/or hardware based application that executes on each respective server 101-105/computing system 130. Each trading application may be different from the other trading applications and may be developed by the user to which the respective server is assigned. For example, user A may develop trading application 122*a* and load/have loaded that application on server 101 (e.g., through an administration application) where the application executes. Similarly, user B may develop trading application 122*b* and load/have loaded that application on server 102 (e.g., through an administration application) where the application executes. In addition to and/or as another example, trading applications 122*a-f* may be generic applications (such as APIs) provided by the entity(s) that owns/operates system 100. In each instance, each respective user A-F may customize its respective application (e.g., through an API that the user interfaces with either through a computing system remote from the respective server, through an administration application, and/or through a user interface device (keyboard/mouse/etc.) connected to the respective server, etc.) to meet their needs. One skilled in the art will recognize that these configurations are merely examples and that other and/or additional configurations are possible. For example, rather than trading applications 122*a-f* being automated trading algorithms that execute trading strategies, one or more of trading applications 122*a-f* may allow a respective user(s) to interface with system 100 and generate orders. For example, a respective user (through a remote computing system and/or through a user interface device (keyboard/mouse/etc.) connected to a respective server, etc.) may be able to manually submit orders to a respective matching engine of a server.

As discussed, matching engines 120*a-f*, together with respective trading applications 122*a-f*, at each server may enable users A-F to trade items between one another. As one example, a single instance of a matching engine may be configured to trade one particular item (e.g., the 10 yr note). Accordingly, if a given user A-F desires to trade multiple different items (e.g., the 5 and 10 yr notes), the respective server may have multiple instances of matching engine 120 executing, each communicating with one or more instances of a respective trading application 122. As another example, a single instance of a matching engine may be configured to trade multiple items, the matching engine communicating with one or more instances of a respective trading application. One skilled in the art will recognize that these are merely examples and other and/or additional configurations are possible. For example, if a given server is being used by multiple different users, the server may have multiple instances of a matching engine configured to trade the same item, but for different users. For discussion purposes only, matching engine 120 will be described as enabling the trading of one item.

According to an example, for a given user A-F that desires to trade a given item, the matching engine 120*a-f* of the respective server may maintain/be configured to maintain an order book 124*a-f* for that item on the server. As an example, a respective order book may be maintained within memory of the respective server. For example, if each of users A-E desires to trade a given item, each server 101-105 may have an order book 124*a-e* for that item. Server 106 may not have an order book for that item if user F does not desire to trade that item. In this fashion, an order book for a given item may be distributed or decentralized across multiple servers. Similarly, if each of users A-E also desires to trade a second item, the matching engine(s) 120*a-e* of the respective servers 101-105 may also maintain a second order book for the second item on the server. One skilled in the art will recognize that additional and/or other order book configurations are possible.

According to a further example, for each item that may be traded over system 100, that item may be assigned a port (e.g., an Internet Protocol (IP) port) or channel, etc. on network 100. For example, a first item may be assigned port "x" and a second item may be assigned port "y", etc. As further discussed herein, a portion or all communications between servers 101-106 over network 110 regarding the first item may occur via port "x" and similarly, a portion or all communications between servers 101-106 over network 110 regarding the second item may occur via port "y". According to a further example, if a given user, say A, desires to trade the first item and the second item, server 101/matching engine(s) 120a may be configured to send and/or receive (and/or listen for, monitor, etc.) messages/ commands/information/data on ports "x" and "y". In this fashion, user A (e.g., through trading application 122a) may send/receive information/data regarding the two items. Similarly, for example, if user A desires to trade the first item but not the second item, server 101/matching engine(s) 120a may be configured to send and/or receive (and/or listen for, monitor, etc.) messages/commands/information/data on port "x" but not on port "y". In this fashion, for example, server 101/user A may choose not to receive messages/commands/ information/data on the second item to which it has no concern. Similarly, if user A (e.g., through trading application 122a) later has a desire to receive information on the second item, server 101/matching engine(s) 120a may be configured to send and/or receive (and/or listen for, monitor, etc.) messages on port "y". According to one example, trading applications 122a-f (possibly through user control) may determine which items are be traded and/or not be traded and in this fashion, control the configuration of a respective server/matching engine(s) as to, for example, which port(s) are monitored, and for which items an order book is maintained. As another example, a user (e.g., through an API that the user interfaces with either through a computing system remote from the respective server, through an administration application, and/or through a user interface device (keyboard/mouse/etc.) connected to the respective server, etc.) may control the configuration of a respective server/matching engine(s) as to, for example, which port(s) are monitored, and for which items an order book is maintained.

According to an example operation of system 100, if a user/trading application, such as user A/trading application 122a, is interested in trading a given item, say item "w", user A/trading application 122a may generate a bid order or an offer order for item "w" (which order may include a price and/or size). Trading application 122a may forward the order to matching engine 120a, which may place the order in order book 124a (i.e., the order book at server 101 for item "w"). This order is shown in FIG. 1 as order 140 in order book 124a. According to an example operation of system 100, since user A generated order 140, matching engine 120a may be responsible for controlling execution of orders against order 140 (e.g., matching contra-orders against order 140). According to a further example operation of system 100, matching engine 120a may also multicast order 140 via network 110 over the port assigned to item "w". The multicasted order may include some designation that it originated from user A/trading application 122a/ matching engine 120a and/or server 101. For each other user/server on system 100 that may have interest in item "w" and has thus been configured to receive on the port for that item, the respective matching engine may receive order 140 and place the order in its respective order book for that item. For example, users B/trading application 122b and user C/trading application 122c may have interest in item "w" and thus, matching engines 120b and 120c may be configured to receive order 140 and place the order into respective order books 124b and 124c (as shown by 140' and 140" in FIG. 1). Similarly, matching engines 120b and 120c may record some designation that the order originated from user A/trading application 122a/matching engine 120a/and/or server 101. Respective matching engines 120b and 120c may also forward information on order 140 to respective trading applications 122b and 122c and/or users B and C. While order 140 may be made known to users B-C/trading applications 120b-c, the origin of the order (i.e., identity of user A) may or may not be made known, depending on whether system 100 is an anonymous matching system.

Similarly, if user B/trading application 122b generates an order for item "w", trading application 122b may forward the order to matching engine 120b, which may place the order in order book 124b (i.e., the order book at server 102 for item "w"). This order is shown in FIG. 1 as order 142 in order book 124b. Since user B generated order 142, matching engine 120b may be responsible for controlling execution of orders against order 142 (e.g., matching contra-orders against order 140). Matching engine 120b may also multicast order 142 via network 110 over the port assigned to item "w". The multicasted order may include some designation that it originated from user B/trading application 122b/ matching engine 120b/and/or server 102. For each other user/server on system 100 that may have interest in item "w" and has thus been configured to receive on the port for that item, the respective matching engine may receive order 142 and place the order in its respective order book for that item. For example, as discussed, since user A/trading application 122a and user C/trading application 122c has interest in item "w", matching engines 120a and 120c may receive order 142 and place the order into respective order books 124a and 124c (as shown by 142' and 142" in FIG. 1). Similarly, matching engines 120a and 120c may record some designation that the order originated from user B/trading application 122b/matching engines 120b and/or server 102. Respective matching engines 120a and 120c may also forward information on order 142 to respective trading applications 122a and 122c and/or users A and C.

According to a further example operation of system 100, if user A/trading application 122a later cancels all or a portion of order 140, it may generate a cancel command for the order, which command may be forwarded to matching engine 120a. Matching engine 120a may in turn cancel the order from its order book 124a and also may multicast the cancel command via network 110 over the port assigned to item "w". The cancel command may include some designation that it originated from user A/trading application 122a/matching engines 120a/and/or server 101 such that other servers may know to which order the cancel command refers to. For each other user/server that may have interest in item "w" and has thus been configured to receive on the port for that item, the respective matching engine may receive the cancel command and cancel the respective order from its respective order book. For example, matching engines 120b-c may receive the cancel command and cancel order 140 from order books 124b-c. Matching engines 120b-c may also notify trading applications 122b-c and/or users B and C that order 140 is no longer available.

Assuming the bid/offer order 140 from A is not canceled, user B/trading application 122b may generate a trading command/contra-order/counter-order, e.g., hit/take, against the order (which hit/take command may include a price and size) (as another example, the trading command may be a bid or offer that crosses with/matches with order 140—such as at a certain price). Trading application 122b may forwarded the trading command to matching engine 120b, which may search its order book 124b for matching orders, and which may recognize/determine that the command matches against at least order 140 from user A (matching engine 120b, recognizing that order 142 originated from user B, may not attempt to match the trading command against order 142). In response, matching engine 120b may multicast the trading command via network 110 over the port assigned to item "w". In addition to adding some designation that that this trading command originated from user B/trading application 122b/matching engine 120b/and/or server 102 for example, the trading command may be specifically tagged for/designated for/directed to user A/trading application 122a/server 101/and/or matching engine 120a, since, as noted, matching engine 120a may be responsible for executing against orders that originate from user A/server 101. One skilled in the art will recognize that other means may be used to notify matching engine 120a that the trading command is against an order for which matching engine 120a may be responsible for executing against. According to one example operation of system 100, other servers/matching engines may receive the multicasted trading command (e.g., those listening on the port assigned to item "w") and may ignore the command recognizing the command was designated for user A/trading application 122a/server 101/and/or matching engine 120a. According to another example operation of system 100, such servers/matching engines may receive the multicasted trading command and provide notification of the potential trade to their respective trading applications and/or users. According to one example, the actual trading command may be encrypted.

According to a further example, if additional orders are in order book 124b not of user B and the trading command from user B/trading application 122b is of a size that exceeds order 140 and/or is thereby against these other order(s), matching engine 120b may also multicast an additional trading command(s) (tagged for the server etc. responsible for the additional order(s)) via network 110 over the port assigned to item "w". As another alternative, matching engine 120b may user the same trading command tagged for user A/trading application 122a/server 101/and/or matching engine 120a, and also tag it for the server etc. responsible for the additional order(s)). One skilled in the art will recognize other variations are possible.

Upon receiving the trading command, server 101/matching engine 120a may recognize that the command is tagged for it. Matching engine 120a may next determine if order 140 is still available (e.g., has not been canceled and/or executed against by other users; is still in order book 124a). If still available, matching engine 120a may execute the trading command against order 140 by removing order 140 from its order book 124a (or reducing the available quantity of order 140 in the order book if all of it is not executed against). Matching engine 120a may also communicate with trading application 122a and/or user A, indicating that order 140 has been executed against. Furthermore, matching engine 120a may multicast a trade confirmation message via network 110 over the port assigned to item "w". The conformation message may include an indication as to the amount of order 140 that was actually executed against. The confirmation message may be specifically tagged for user B/trading application 122b/matching engine 120b/and/or server 102. Upon receiving the confirmation message, matching engine 124b may remove order 140 (or a portion thereof) from its order book 124b and may also notify user B and/or trading application 122b of the matched order. In addition to user B, all other users/servers/matching engines that have interest in item "w" may receive the confirmation message, causing the respective matching engines to remove order 140 (or a portion thereof) from their order books. Such matching engines may also notify their respective users and/or trading applications of the matched order. Hence, matching engine 120c may remove order 140 from its order book 124c and also notify trading application 122c and/or user C. According to another and/or additional example, in addition to matching engine 120a multicasting the confirmation message, it may multicast some other command (such as cancel command) to cause other matching engines (like engine 120c) to remove order 140 from its order book. One skilled in the art will recognize that other and/or additional command sequences may be used.

As another example, if matching engine 120a determines order 140 is not still available (e.g., has been canceled and/or already executed against by other users) upon receiving the trading command from user B as discussed above, it may multicast a cancel message for order 140 and/or a message specifically designating non-confirmation of the trade and/or that the trade failed and/or that the trade did not go through, etc. (which may be specifically tagged for user B/trading application 122b/matching engine 120b/and/or server 102). Regardless, the effect of the message(s) may be for all applicable matching engines to remove order 140 from their respective order books. Again, respective trading applications and/or users may be notified by their respective matching engines that command 140 is no longer available. Trading application 122b and/or user B may be specifically notified that the trade failed.

According to another example, after matching engine 120a may determine order 140 is still available as discussed above, matching engine 120a may first communicate with trading application 122a and/or user A to determine if there is still a desire to execute against order 140. If so, matching engine 120a may proceed as discussed above with respect to generating a confirmation message, etc. It not, matching engine 120a may remove order 140 from its order book 124a and may then proceed as discussed above with respect to generating a cancel and/or non-confirmation message, resulting in order 140 being removed from other order books. Again, respective trading applications/users at other servers may be notified by their respective matching engines that command 140 is no longer available. They may also be notified that while order 140 was pending, the respective originator of the order (i.e., user A) no longer desires to execute against the order. One skilled in the art will recognize other and/or additional message flows are possible regarding the execution against or non-execution against order 140.

According to a further aspect of the example operation discussed above, if, for example, user C/trading application 122c generates a trading command against order 140 at a substantially similar time as user B/trading application 122b as discussed herein, matching engine 120c may multicast a trading command via network 110 in similar fashion as matching engine 120b. In such an event, matching engine 120a may receive two trading commands against order 140 (one from user B and one from user C), each inevitably queued with one before the other, depending on which happens to reach server 101 first. Again, because matching engine 120a may be responsible for controlling the execution against orders that originate from user A/server 101 (here, e.g., order 140), matching engine 120a may execute order 140 against only one of user B and user C (assuming both users have attempted to execute the full size of order 140), depending on which reaches server 101 first. Matching engine 120*a* may send, for example, a non-confirmation against the other trading command. As another example, the trading command of one of user B and user C may be fully executed and the other only partially executed if order 140 is not of sufficient size to fill both. One skilled in the art will recognize that other variations are possible.

One skilled in the art will recognize that the above described example operation of system 100 is an example, and that other and/or additional example operations are possible.

According to a further example feature, system 100 may remove a need to produce drop copies. For example, in matching engine 120*a* generating a trade confirmation message as described herein, for example, in addition to other matching engines 120*b-f* possibly receiving this message and updating respective order books 124*b-f*, other computing system(s) (represented by computing system 150) connected to network 110 may receive these messages. These other computing systems may or may not be associated with users/customers seeking to use system 100 for trading items. For example, computing system 150 may be associated with a clearing house that may clear transactions, such as the example transaction between users A and B discussed herein.

According to a further example feature of system 100, if, for example, trading application (such as application 122*e*) begins to submit bids and/or offers, for example, for an item at prices that are off market and there is a need to stop trading application 122*e* and potentially remove those bids and offers from the market, server 105 may be taken off-line. Taking server 105 off-line may include, for example, taking the entire server off-line, shutting down/halting/suspending matching engine 120*e*, causing matching engine 120*e*/server 105 to no longer listen to/receive on/transmit over the port associated with the item, etc. (such as by a command from an administrator). Notably, each action may cause trading application 122*e* to no longer be able to submit orders. Similarly, because matching engine 120*e* is responsible for controlling the execution of trading commands against orders submitted by trading application 122*e*, each above noted action will cause matching engine 120*e* to no longer be able to do such. For example, causing matching engine 120*e*/server 105 to no longer listen to/receive on the port associated with the item, matching engine 120*e* will not receive the trading commands. One skilled in the art will recognize that these are merely examples, and other and/or additional example features of system 100 are possible.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

The following sections provide a guide to interpreting the present application.

I. TERMS

The term "product" means a machine, manufacture and/or composition of matter, unless expressly specified otherwise.

The term "process" means a process, algorithm, method, or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the invention", unless expressly specified otherwise.

The term "variation" of an invention means an embodiment of the invention, unless expressly specified otherwise.

The term "indication" is used in an extremely broad sense. An "indication" of a thing should be understood to include anything that may be used to determine the thing.

An indication of a thing may include an electronic message that identifies the thing (e.g., an identification of a widget by a serial number affixed to the widget, an identification of a widget by one or more characteristics of the widget). An indication of a thing may include information that may be used to compute and/or look-up a thing (e.g., information identifying a machine of which a widget is a part that may be used to determine the widget). An indication of a thing may specify things that are related to the thing (e.g., characteristics of the thing, a name of the thing, a name of a thing related to the thing). An indication of a thing may not specify things that are related to the thing (e.g., a letter "a" may be an indication of a widget of a computer system that is configured to interpret the letter "a" to identify the widget). An indication of a thing may include a sign, a symptom, and/or a token of the thing. An indication, for example, may include a code, a reference, an example, a link, a signal, and/or an identifier. An indication of a thing may include information that represents, describes, and/or otherwise is associated with the thing.

A transformation of an indication of a thing may be an indication of the thing (e.g., an encrypted indication of a thing may be an indication of the thing). An indication of a thing may include the thing itself, a copy of the thing, and/or a portion of the thing. An indication of a thing may be meaningless to a thing that is not configured to understand the indication (e.g., a person may not understand that a letter "a" indicates a widget, but it may nonetheless be an indication of the widget because the computer system may determine the widget from the letter "a"). It should be understood that the fact that an indication of a thing may be used to determine the thing does not mean that the thing or anything else is determined. An indication of a thing may include an indication of any number of the thing unless specified otherwise. An indication of a thing may include an indication of other things (e.g., an electronic message that indicates many things). (Indication can be used as a very broad term in claim language. For example: receiving an indication of a financial instrument.)

The term "represent" means (1) to serve to express, designate, stand for, or denote, as a word, symbol, or the like does; (2) to express or designate by some term, character, symbol, or the like; (3) to portray or depict or present the likeness of, as a picture does; or (4) to serve as a sign or symbol of.

A reference to "another embodiment" in describing an embodiment does not imply that the referenced embodiment is mutually exclusive with another embodiment (e.g., an embodiment described before the referenced embodiment), unless expressly specified otherwise. Similarly, the mere fact that two (or more) embodiments are referenced does not imply that those embodiments are mutually exclusive.

One embodiment of the invention may include or cover or embrace more than one other embodiment of the invention. For example, a first embodiment comprising elements a, b, and c may cover a second embodiment that comprises elements a, b, c, and d as well as a third embodiment covering elements a, b, c, and e. Similarly, each of the first, second, and third embodiments may cover a fourth embodiment comprising elements a, b, c, d, and e.

The terms "including", "comprising" and variations thereof mean "including but not necessarily limited to", unless expressly specified otherwise. Thus, for example, the sentence "the machine includes a red widget and a blue widget" means the machine includes the red widget and the blue widget but may possibly include one or more other items as well.

The term "consisting of" and variations thereof mean "including and also limited to", unless expressly specified otherwise. Thus, for example, the sentence "the machine consists of a red widget and a blue widget" means the machine includes the red widget and the blue widget but does not include anything else.

The term "compose", and variations thereof mean "to make up the constituent parts of, component of or member of", unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of, to be the only components of, or to be the only members of", unless expressly specified otherwise. Thus, for example, the sentence "the red widget and the blue widget exclusively compose a machine" means the machine consists of the red widget and the blue widget (i.e. and nothing else).

The terms "a", "an" and "the" refer to "one or more", unless expressly specified otherwise. Thus, for example, the phrase "a widget" means one or more widgets, unless expressly specified otherwise. Similarly, after reciting the phrase "a widget", a subsequent recitation of the phrase "the widget" means "the one or more widgets". Accordingly, it should be understood that the word "the" may also refer to a specific term having antecedent basis. For example, if a paragraph mentions "a specific single feature" and then refers to "the feature," then the phrase "the feature" should be understood to refer to the previously mentioned "a specific single feature." (It should be understood that the term "a" in "a specific single feature" refers to "one" specific single feature and not "one or more" specific single features.)

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car, and a wheel. The phrase "at least one of", when such phrase modifies a plurality of things does not mean "one of" each of the plurality of things. For example, the phrase "at least one of a widget, a car and a wheel" does not mean "one widget, one car and one wheel".

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" covers both "based only on" and "based at least on". The phrase "based at least on" is equivalent to the phrase "based at least in part on". For example, the phrase "element A is calculated based on element B and element C" covers embodiments where element A is calculated as the product of B times C (in other words, A=B×C), embodiments where A is calculated as the sum of B plus C (in other words, A=B+C), embodiments where A is calculated as a product of B times C times D, embodiments where A is calculated as a sum of the square root of B plus C plus D times E, and so on.

The term "represent" and like terms are not exclusive, unless expressly specified otherwise. For example, the term "represents" does not mean "represents only", unless expressly specified otherwise. For example, the phrase "the data represents a credit card number" covers both "the data represents only a credit card number" and "the data represents a credit card number, and the data also represents something else".

The term "whereby" is used herein only to precede a clause or other set of words that express only the intended result, objective, or consequence of something that is explicitly recited before the term "whereby". Thus, when the term "whereby" is used in a claim, the clause, or other words that the term "whereby" modifies do not establish specific further limitations of the claim or otherwise restrict the meaning or scope of the claim.

The terms "e.g.", "such as" and like terms mean "for example", and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first of the two machines has a function, and the second of the two machines has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

A numerical range includes integers and non-integers in the range, unless expressly specified otherwise. For example, the range "1 to 10" includes the integers from 1 to 10 (e.g., 1, 2, 3, 4, . . . 9, 10) and non-integers (e.g., 1.0031415926, 1.1, 1.2, . . . 1.9).

Where two or more terms or phrases are synonymous (e.g., because of an explicit statement that the terms or phrases are synonymous), instances of one such term or phrase does not mean instances of another such term or phrase must have a different meaning. For example, where a statement renders the meaning of "including" to be synonymous with "including but not limited to", the mere usage of the phrase "including but not limited to" does not mean that the term "including" means something other than "including but not limited to".

II. DETERMINING

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database, or another data structure), rendering into electronic format or digital representation, ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing, averaging and the like.

The term "determining" does not imply that mathematical processing must be performed and does not imply that numerical methods must be used, and does not imply that an algorithm is used.

The term "determining" does not imply that any particular device must be used. For example, a computer need not necessarily perform the determining.

The term "determining" may include "calculating". The term "calculating" should be understood to include performing one or more calculations. Calculating may include computing, processing, and/or deriving. Calculating may be performed by a computing device. For example, calculating a thing may include applying an algorithm to data by a computer processor and generating the thing as an output of the processor.

The term "determining" may include "referencing". The term "referencing" should be understood to include making one or more reference, e.g., to a thing. Referencing may include querying, accessing, selecting, choosing, reading, and/or looking-up. The act of referencing may be performed by a computing device. For example, referencing a thing may include reading a memory location in which the thing is stored by a processor.

The term "determining" may include "receiving". For example, receiving a thing may include taking in the thing. In some embodiments, receiving may include acts performed to take in a thing, such as operating a network interface through which the thing is taken in. In some embodiments, receiving may be performed without acts performed to take in the thing, such as in a direct memory write or a hard wired circuit. Receiving a thing may include receiving a thing from a remote source that may have calculated the thing.

III. FORMS OF SENTENCES

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to that limitation (e.g., "the widget"), this mere usage does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another embodiment more than one device or article (whether or not they cooperate) may alternatively be used in place of the single device or article that is described. Accordingly, the functionality that is described as being possessed by a device may alternatively be possessed by more than one device or article (whether or not they cooperate) in another embodiment.

Similarly, where more than one device, article or other product is described herein (whether or not they cooperate), in another embodiment a single device or article may alternatively be used in place of the more than one device or article that is described. For example, a plurality of computer-based devices may be substituted with a single computer-based device. In some embodiments, such a plurality of computer-based devices may operate together to perform one step of a process such as is common in grid computing systems. In some embodiments, such a plurality of computer-based devices may operate provide added functionality to one another so that the plurality may operate to perform one step of a process such as is common in cloud computing systems. (Conversely, a single computer-based device may be substituted with multiple computer-based devices operating in cooperation with one another. For example, a single computing device may be substituted with a server and a workstation in communication with one another over the internet) Accordingly, the various functionality that is described as being possessed by more than one device or article may alternatively be possessed by a single device or article.

The functionality and/or the features of a single device that is described may, in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

IV. DISCLOSED EXAMPLES AND TERMINOLOGY ARE NOT LIMITING

Neither the Title (set forth at the beginning of the first page of the present application) nor the Abstract (set forth at the end of the present application) is to be taken as limiting in any way the scope of the disclosed invention, is to be used in interpreting the meaning of any claim or is to be used in limiting the scope of any claim. An Abstract has been included in this application merely because an Abstract is required under 37 C.F.R. § 1.72(b).

The headings of sections provided in the present application are for convenience only and are not to be taken as limiting the disclosure in any way.

Numerous embodiments are described in the present application and are presented for illustrative purposes only. The described embodiments are not, and are not intended to be, limiting in any sense. The disclosed invention is widely applicable to numerous embodiments, as is readily apparent from the disclosure. One of ordinary skill in the art will recognize that the disclosed invention may be practiced with various modifications and alterations, such as structural, logical, software, and electrical modifications. Although particular features of the disclosed invention may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not be interpreted as requiring features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or (with respect to a claim and the invention defined by that claim) expressly recited in that claim.

Any preambles of the claims that recite anything other than a statutory class shall be interpreted to recite purposes, benefits and possible uses of the claimed invention, and such preambles shall not be construed to limit the claimed invention.

The present disclosure is not a literal description of all embodiments of the invention. Also, the present disclosure is not a listing of features of the invention which must be present in all embodiments.

All disclosed embodiments are not necessarily covered by the claims (even including all pending, amended, issued, and canceled claims). In addition, a disclosed embodiment may be (but need not necessarily be) covered by several claims. Accordingly, where a claim (regardless of whether pending, amended, issued, or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries. Devices are in communication with one another if they are capable of at least one-way communication with one another. For example, a first device is in communication with a second device if the first device is capable of transmitting information to the second device. Similarly, the second device is in communication with the first device if the second device is capable of receiving information from the first device.

A description of an embodiment with several components or features does not imply that all or even any of such components or features are required. On the contrary, a variety of optional components are described to illustrate the wide variety of possible embodiments of the present invention. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are preferred, essential or required. Various other embodiments within the scope of the described invention include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. COMPUTING

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

The term "compute" shall mean to determine using a processor in accordance with a software algorithm.

A "processor" means one or more microprocessors, central processing units (CPUs), computing devices, microcontrollers, digital signal processors, graphics processing units (GPUs) or like devices or any combination thereof, regardless of the architecture (e.g., chip-level multiprocessing or multi-core, RISC, CISC, Microprocessor without Interlocked Pipeline Stages, pipelining configuration, simultaneous multithreading, microprocessor with integrated graphics processing unit, GPGPU).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory that stores a program comprising instructions that, when executed by the processor, direct the processor to perform the method.

The apparatus that performs the process can include a plurality of computing devices that work together to perform the process. Some of the computing devices may work together to perform each step of a process, may work on separate steps of a process, may provide underlying services that other computing devices that may facilitate the performance of the process. Such computing devices may act under instruction of a centralized authority. In another embodiment, such computing devices may act without instruction of a centralized authority. Some examples of apparatus that may operate in some or all of these ways may include grid computer systems, cloud computer systems, peer-to-peer computer systems, computer systems configured to provide software as a service, and so on. For example, the apparatus may comprise a computer system that executes the bulk of its processing load on a remote server, but outputs display information to and receives user input information from a local user computer, such as a computer system that executes VMware software.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any non-transitory medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), wireless local area network communication defined by the IEEE 802.11 specifications whether or not they are approved by the WiFi Alliance, SAP, ATP, Bluetooth, and TCP/IP, TDMA, CDMA, and 3G; and/or (iv) encrypted to ensure privacy or prevent fraud in any of a variety of ways well known in the art.

The term "database" refers to any electronically-stored collection of data that is stored in a retrievable format.

The term "data structure" refers to a database in a hardware machine such as a computer.

The term "network" means a series of points or nodes interconnected by communication paths. For example, a network can include a plurality of computers or communication devices interconnected by one or more wired and/or wireless communication paths. Networks can interconnect with other networks and contain subnetworks.

The term "predetermined" means determined beforehand, e.g., before a present time or a present action. For example, the phrase "displaying a predetermined value" means displaying a value that was determined before the act of displaying.

The term "condition" means (1) a premise upon which the fulfillment of an agreement depends, or (2) something essential to the appearance or occurrence of something else.

The term "transaction" means (1) an exchange or transfer of goods, services, or funds, or (2) a communicative action or activity involving two parties or things that reciprocally affect or influence each other.

Thus a description of a process is likewise a description of a computer-readable medium storing a program for performing the process. The computer-readable medium can store (in any appropriate format) those program elements which are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel®, Pentium®, or Centrino™, Atom™ or Core™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

As used herein, the term "encryption" refers to a process for obscuring or hiding information so that the information is not readily understandable without special knowledge. The process of encryption may transform raw information, called plaintext, into encrypted information. The encrypted information may be called ciphertext, and the algorithm for transforming the plaintext into ciphertext may be referred to as a cipher. A cipher may also be used for performing the reverse operation of converting the ciphertext back into plaintext. Examples of ciphers include substitution ciphers, transposition ciphers, and ciphers implemented using rotor machines.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back in to plaintext. An example of an asymmetric key algorithm is the RSA algorithm.

VI. CONTINUING APPLICATIONS

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, PARAGRAPH 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material, or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. DISCLAIMER

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application will be prefaced by the phrase "does not include" or by the phrase "cannot perform".

IX. INCORPORATION BY REFERENCE

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference. Conversely, the definitions provided in this application should not be used to limit, define, or otherwise construe any term of any document incorporated herein by reference. The definitions set forth explicitly in this application are controlling notwithstanding the description of particular embodiments that may be incompatible with the definition(s).

Any incorporation by reference does not, in and of itself, imply any endorsement of, ratification of, or acquiescence in any statements, opinions, arguments or characterizations contained in any incorporated patent, patent application or other document, unless explicitly specified otherwise in this patent application.

X. PROSECUTION HISTORY

In interpreting the present application (which includes the claims), one of ordinary skill in the art refers to the prosecution history of the present application, but not to the prosecution history of any other patent or patent application, regardless of whether there are other patent applications that are considered related to the present application, and regardless of whether there are other patent applications that share a claim of priority with the present application.

The invention claimed is:

1. A system comprising a plurality of servers connected to a network, the system is configured to:

each of the plurality of servers is configured to:

maintain, a distinct book of orders to trade one or more items, each of the orders including a quantity and each of the one or more items being assigned a unique port similarly identified on the plurality of servers;

receive a first order to trade a first item of the one or more items;

when the first item of the one or more items in the first order are maintained in the distinct book, (i) place the first order in the book, (ii) control execution of one or more contra-orders against the first order, and (iii) communicate the first order to the plurality of servers over the unique port assigned to the first item of the one or more items; and when the first order is the one or more contra-orders to trade the first item of the one or more items, (i) communicate the first order to a first server of the plurality of servers responsible for controlling execution of the one or more contra-orders against the first order, (ii) remove, by the first server, the quantity of the first order from its book of orders, and (iii) communicate, by the first server over the unique port, a confirmation message to the plurality of servers indicating the first order was traded.

2. The system of claim 1, wherein the one or more items are selected from (i) financial instruments including fixed income securities, equities, foreign exchange, (ii) real-estate property including lots, homes, commercial buildings, and (iii) consumer products including cars, electronics, and airline and concert tickets.

3. The system of claim 2, wherein at least one of the plurality of servers performs a clearing transaction to trade the one or more items.

4. The system of claim 1, wherein the book of orders comprises received and generated orders to trade the one or more items.

5. The system of claim 1, wherein when the distinct book of orders of the first server does not include the first item of the one or more items to be traded the first server does not receive the orders for the first item of the one or more items.

6. The system of claim 1, wherein the orders are removed from the book when a total quantity of the first order is removed.

7. A method comprising:

maintaining, on each of a plurality of servers connected to a network, a distinct book of orders to trade one or more items, each of the orders including a quantity and each of the one or more items being assigned a unique port similarly identified on the plurality of servers;

receiving a first order to trade a first item of the one or more items;

when the first item of the one or more items in the first order are maintained in the distinct book, (i) placing the first order in the book, (ii) controlling execution of one or more contra-orders against the first order, and (iii)

communicating the first order to the plurality of servers over the unique port assigned to the first item of the one or more items; and when the first order is the one or more contra-orders to trade the first item of the one or more items, (i) communicating the first order to a first server of the plurality of servers responsible for controlling execution of the one or more contra-orders against the first order, (ii) removing, by the first server, the quantity of the first order from its book of orders, and (iii) communicating, by the first server over the unique port, a confirmation message to the plurality of servers indicating the first order was traded.

8. The method of claim 7, wherein the one or more items are selected from (i) financial instruments including fixed income securities, equities, foreign exchange, (ii) real-estate property including lots, homes, commercial buildings, and (iii) consumer products including cars, electronics, and airline and concert tickets.

9. The method of claim 8, wherein at least one of the plurality of servers performs a clearing transaction to trade the one or more items.

10. The method of claim 7, wherein the book of orders comprises received and generated orders to trade the one or more items.

11. The method of claim 7, wherein when the distinct book of orders of the first server does not include the first item of the one or more items to be traded the first server does not receive the orders for the first item of the one or more items.

12. The method of claim 7, wherein the orders are removed from the book when a total quantity of the first order is removed.

\* \* \* \* \*